April 7, 1925. 1,532,504
L. LICHTENFELD
PARQUETRY SLAT FLOORING
Filed July 25, 1923
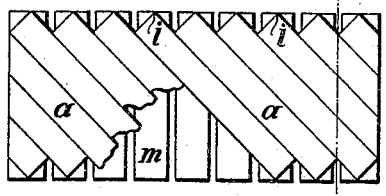
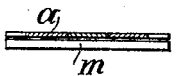
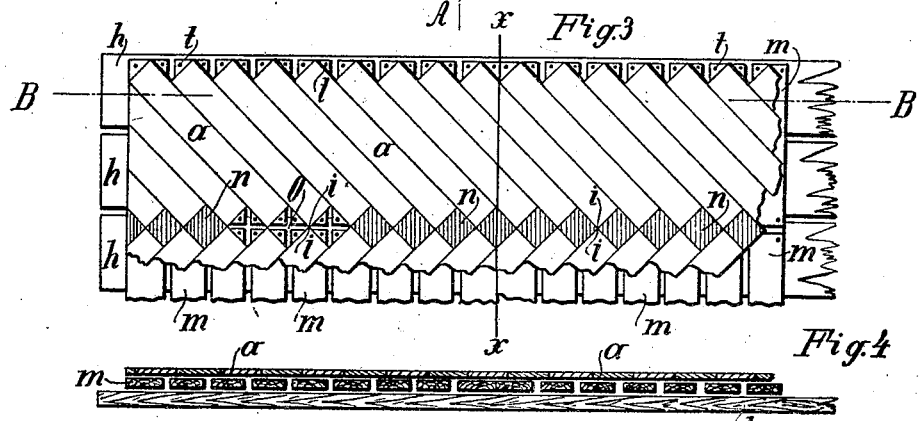
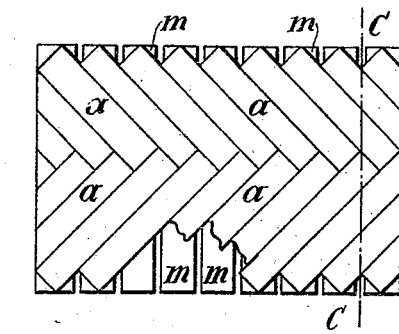
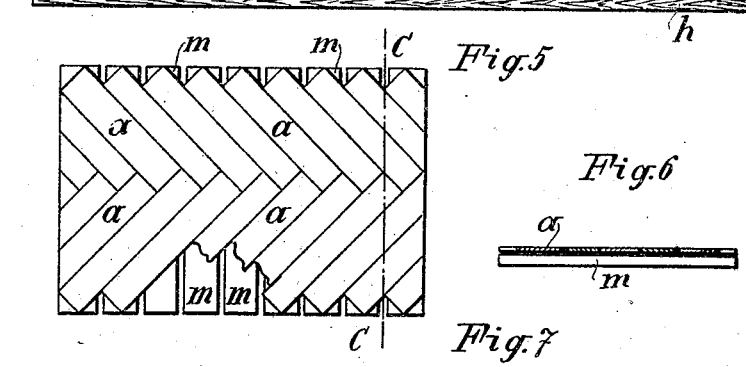
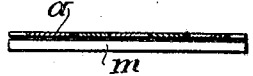
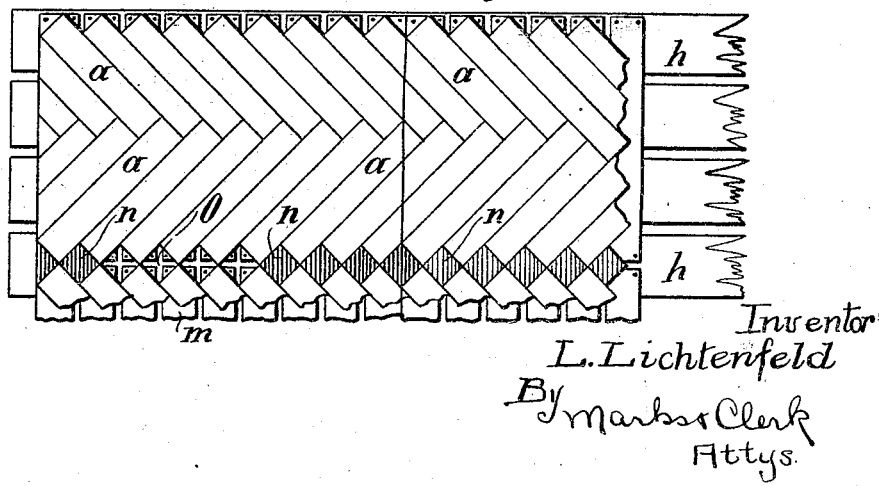
Inventor
L. Lichtenfeld
By Marks & Clerk
Attys.

Patented Apr. 7, 1925.

1,532,504

UNITED STATES PATENT OFFICE.

LEOPOLD LICHTENFELD, OF VIENNA, AUSTRIA.

PARQUETRY-SLAT FLOORING.

Application filed July 25, 1923. Serial No. 653,762.

*To all whom it may concern:*

Be it known that I, LEOPOLD LICHTENFELD, a citizen of the Czechoslovakian Republic, residing at Vienna, in the Republic of Austria, have invented certain new and useful Improvements in Parquetry-Slat Flooring, of which the following is a specification.

This invention relates to a modification of my invention for which a patent was applied for on 26th of May 1923 numbered 641,690.

In the specification of my said main application improved parquetry plates are described wherein the support for the veneers that are assembled to constitute the parquetry design, consists of a grid composed of parallel battens upon which the veneers assembled to constitute the plate, are glued, the ends of said grid battens projecting on all sides beyond the total surface of the veneers. These parquetry plates are laid in accordance with the said main application in the manner that the "channels" formed between the parquetry veneers when the plates are laid side by side, are filled-in with parquetry strips which cover the butt joints of the adjacent grid batten ends.

The present invention consists in a constructional application of the idea upon which the improved parquetry of my said main application is based, to parquetry-slat flooring.

According to the present invention strips of parquetry flooring, each comprising one or more longitudinal rows of parquetry slats, are manufactured away from the site (place of use) in a factory by arranging short battens of determined length parallel to one another in one or more rows having a length of 1.5 to 3 metres at clear distances apart of 1 to 2 centimetres, preferably with the use of a template or a jig, so as to form a long grid upon which the said slats are glued. The said slats are arranged at 45° to the direction of the length of the grid, in such a manner that the apexes of the right-angled free ends of the parquetry slats are flush at both sides with the ends of the grid battens.

The fixing of these strips upon the underfloor at the site is effected by nailing the grid batten ends (which project beyond both sides of the slat-parquetry) down to the under-floor, and filling the square recesses that have been left vacant between the juxtaposed strips, with square wooden plates hereinafter referred to as wood squares, having the same thickness as that of the parquetry slats.

This improved method renders it possible to execute the greater part of the work connected with the manufacture of a parquetry slat floor, in workshops furnished with every appliances for accurate workmanship, and to limit the work to be done at the site merely to the nailing down of the parquetry floor strips and the gluing-in of the squares. This improved construction allows therefore of producing an absolutely tight parquetry slat floor which is absolutely faultless as regards design, and whereof the cost of manufacture is considerably less than that of constructions hitherto known.

A practical construction of an improved floor according to the present invention is illustrated by way of example in the accompanying drawings in which:

Figures 1 and 2 are respectively a plan and a cross section taken along the line A—A of Figure 1, of a parquetry flooring strip comprising a single row of parquetry slats.

Figure 3 is a plan of a portion of an improved floor composed of such strips, in a partly finished condition.

Figure 4 is a section taken along the line B—B of Figure 3.

Figure 5 shows a parquetry flooring strip consisting of two rows of parquetry slats arranged at right angles to one another.

Figure 6 is a cross section taken along the line C—C of Figure 5.

Figure 7 is a plan showing in a partly finished state a portion of a parquetry floor constructed of the parquetry flooring strips shown in Figures 5 and 6.

In the manufacture of the improved parquetry flooring strips illustrated in Figures 1 and 2, a grid composed of short battens $m$ is first prepared, preferably with the aid of the templates or jigs, and the parquetry slats $a$ are glued upon the battens $m$ at 45° to the lengthwise direction of the latter. The flooring strips thus produced are piled upon one another and maintained under pressure until the glue has become completely dry. The dimensions of the grid battens $m$ are so chosen, in accordance with the length and width of the slats $a$, that the ends of the said battens will be flush with the right-angled free corners *i* of the parquetry slats *a*, so that the ends of the grid battens *m* are exposed or project on both sides of the slot corners *i*.

The length of the flooring strips may be as much as 3 metres, and is so chosen, that when two strips are placed together end to end (as shown at *x—x* in Figure 3) the incomplete slats of one strip will be continued by the complementary slots of the second strip so as to form composite slats of the proper lengths.

In laying these prepared flooring strips at the site, they are fastened by nailing to the under-floor, one or two nails *t* being driven into each of the exposed portions of each grid batten end projecting beyond the sides of the corners *i* of the parquetry slats *a*. In this manner the flooring strips are fixed at each width of a slat *a* by means of two or four nails to the under-floor. The laying of the adjacent flooring strip along the width of the already laid strip (Fig. 3) is effected in the same manner viz:—the free corners *i* of the slats *a* are caused to abut together exactly, thereby forming a free square recess O between every two pairs of abutting slats *a* (Fig. 3). After the flooring strips have been fixed to the under-floor, these recesses O are filled-in with wood squares *n* which are glued upon the exposed ends of the grid battens, and weighted until the glue has set. In this manner a parquetry slat floor is produced, the ornamental appearance of which is heightened by the occurrence of the filling squares *n*.

Figures 5 and 6 are respectively a plan and a cross section taken along the line C—C of Figure 5, of an improved flooring strip composed of two rows of parquetry slats. The manufacture of this flooring strip is executed in the same manner as described with reference to Figures 1 to 4, with the sole difference that the length of the grid battens *m* is twice as great as that used for the manufacture of the flooring strips shown in Figures 1 to 4.

A floor (Fig. 7) made up of two-row flooring strips (such as that shown in Figures 5 and 6) differ from the floor illustrated in Figures 3 and 4, which is made-up of one-row flooring strips (such as that shown in Figures 1 and 2) in this that the filling wood squares *n* occur only between the pairs of two-row flooring strips.

Having now particularly described and ascertained the nature of my said invention and in what manner the same is to be performed, I declare that what I claim is:—

1. A flooring comprising a long flooring strip composed of grid battens arranged at right angles to the longitudinal direction of said strip, and parquetry slats glued side by side on said grid battens at an angle of 45° to the lengthwise direction of the latter in such a manner that the grid-batten ends project beyond the free corners of the parquetry slats.

2. A parquetry slat floor composed of improved flooring strips as claimed in claim 1, laid upon the ordinary under-floor the projecting ends of the grid battens being nailed down to the under-floor and wood squares being glued in the recesses occurring at the slat ends of adjacent rows of juxtaposed flooring strips over the exposed portions of the grid battens.

In testimony whereof I affix my signature in presence of two witnesses.

LEOPOLD LICHTENFELD.

Witnesses:
 ING. NICLOS MOVATH,
 SOFIO GREEN.